United States Patent

[11] 3,601,869

[72] Inventors Laurence H. Flora, deceased by late of North Olmsted, Ohio
Mary I. Flora, North Olmsted, Ohio and Cleveland Trust Company, Cleveland, Ohio, both Co-Executors
[21] Appl. No. 849,928
[22] Filed Aug. 13, 1969
Division of Ser. No. 655,248, Dec. 22, 1966, Patent No. 3,478,395, which is a division of Ser. No. 284,223, May 29, 1963, Patent No. 3,313,083
[45] Patented Aug. 31, 1971
[73] Assignee Eaton Yale & Towne Inc. Cleveland, Ohio

[54] FASTENERS
10 Claims, 4 Drawing Figs.
[52] U.S. Cl. .................................................. 24/73 SP, 85/70
[51] Int. Cl. .................................................. F16b 13/06
[50] Field of Search .................................................. 85/70, 72, 80; 151/41.75; 248/27; 24/73

[56] References Cited
UNITED STATES PATENTS

| | | | |
|---|---|---|---|
| 2,836,214 | 5/1958 | Rapata | 85/80 |
| 2,887,926 | 5/1959 | Edwards | 85/70 |
| 3,143,916 | 8/1964 | Rice | 85/71 |
| 3,174,387 | 3/1965 | Fischer | 85/71 |

Primary Examiner—Donald A. Griffin
Attorney—Teare, Teare & Sammon

ABSTRACT: A plastic fastener including a bored head portion, a pair of tab portions extending downwardly from the head portion, a bored body portion including a plunger member extending downwardly from the head portion with the upper end of the plunger member being severably connected to the tab portions, and a pair of resilient leg portions connecting the head portion to the body portion adapted to be deformed outwardly with movement of the plunger member between the tab portions upon self-threading movement of a threaded member through the lower end of the body portion, and abutments on the body portion adapted for engagement with the tab portions to limit upward movement of the body portion toward the head portion.

PATENTED AUG 31 1971

3,601,869

INVENTOR.
LAURENCE H. FLORA
BY

*Teare, Teare & Sammon*
ATTORNEYS

FASTENERS

The application is a division of the application to Laurence H. Flora, now U.S. Pat. No. 3,478,395 filed Dec. 22, 1966, which is a division of the application to Laurence H. Flora, Ser. No. 284,223 filed May 29, 1963, now U.S. Pat. No. 3,313,083

This invention relates in general to fastening means, and more particularly to plastic fasteners for the securing of two or more members together, such as for instance a pair of metal panels, or the securing of, for instance, molding or trim strip to a panel.

The fastener means of the instant invention is adapted to be used in place of sheet metal fasteners, or sheet metal screws, or nuts and bolts, and is particularly adapted for use in blind location attachments, where only one side of an assembly is accessible to a workman. The plastic fastener arrangements of the invention provide the ultimate in molding retention, and overcome rusting problems relating to the engagement of dissimilar metals, and lessen chances of trapped moisture in the assemblies.

Accordingly, an object of the instant invention is to provide novel plastic fasteners for holding two or more members together.

Another object of the invention is to provide a deformable plastic fastener which may be readily inserted through aligned openings in two or more members, or through an opening in only one side of the supporting member, for securely attaching the members together.

Another object of the invention is to provide various forms of fasteners for tying or fastening together a pair of members, such as a pair of superimposed panels, and wherein the fastener comprises a comparatively small, inexpensive member of plastic material, which fastener is adapted to extend through apertures in the panel members, and to be deformed upon threaded driving of a screw associated therewith, for securely attaching the members together.

Another object of the invention is to provide a deformable plastic fastener adapted to secure a pair of members together, such as for instance a pair of panel members having aligned apertures therethrough, and wherein the fastener comprises a body portion, a head portion, and laterally disposed straplike collapsible locking legs extending between the head and body portions, and wherein a threaded member is adapted to extend between the head portion and the body portion, and to draw the body portion toward the head portion when the fastener is in said apertures, thereby causing the locking legs to collapse behind the panel assembly, and secure the fastener to the supporting panel members.

Another specific object of the invention is to provide a fastener of the above-mentioned type wherein the head portion includes means thereon for snap fastening coaction with another object, such as for instance trim strip, for holding the trim strip in assembled relation with a panel or panels.

A still further object of the invention is to provide a plastic fastener arrangement which is adapted for attachment to a supporting member or panel, and which eliminates the problems of rusting due to engagement between dissimilar metals, and which embodies means thereon for readily attaching a trim strip to the supporting member of panel, and in a manner to prevent the entrapment of moisture behind the trim strip.

Other objects and advantages of the invention will be apparent from the following description taken in conjunction with the accompanying drawings wherein.

Figure 1:
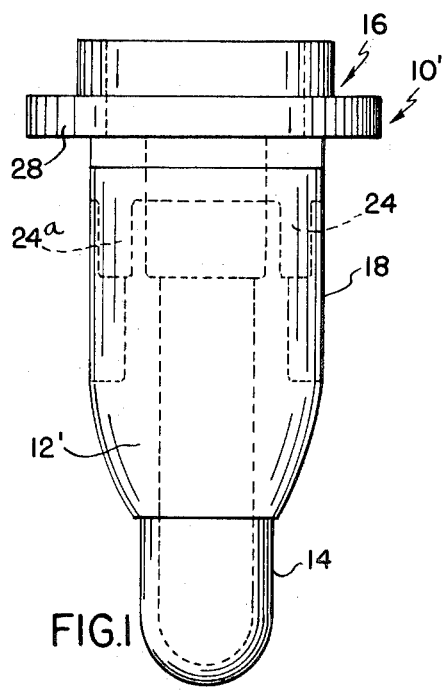
FIG. 1 is a side elevational view of the fastener made in accordance with the invention.
Figure 2:
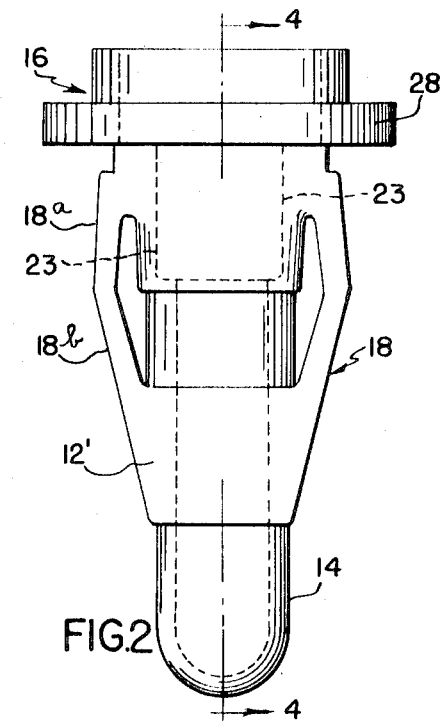
FIG. 2 is an end elevational view of the fastener of FIG. 1.
Figure 3:
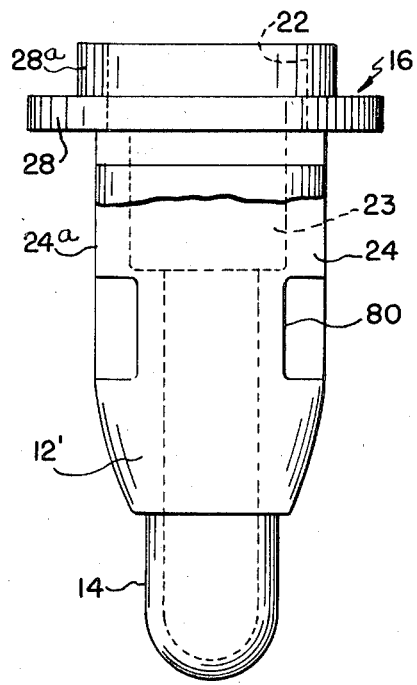
FIG. 3 is a partially broken elevational view of the fastener of FIG. 1.

Referring now again to the drawings, and particularly to FIGS. 1 through 4 thereof, there is shown a plastic fastener 10 comprising a generally wedge-shaped body portion 12' having a protrusion 14 projecting downwardly therefrom. A head portion 16 is secured to the body portion 12, and by means of relatively thin collapsible or deformable straplike legs 18 extending between the head and body portions, and merging therewith. As best seen for instance in FIG. 2, the legs 18 initially diverge or slope slightly outwardly, as at 18a, and then turn inwardly, as at 18b, to smoothly merge with the tapered or wedge-shaped body portion 12. Such a diverging arrangement is useful in insertion of the fastener into the opening or aperture in a supporting member or panel and for holding the fastener in assembled relation with the panel prior to its being deformed or collapsed to secured relation on the panel, as shown in U.S. Pat. No. 3,313,083.

The fastener may be formed from a single piece of relatively high strength, deformable plastic material, such as for instance nylon. It may be die-molded lending itself to mass production procedures.

Figure 4:
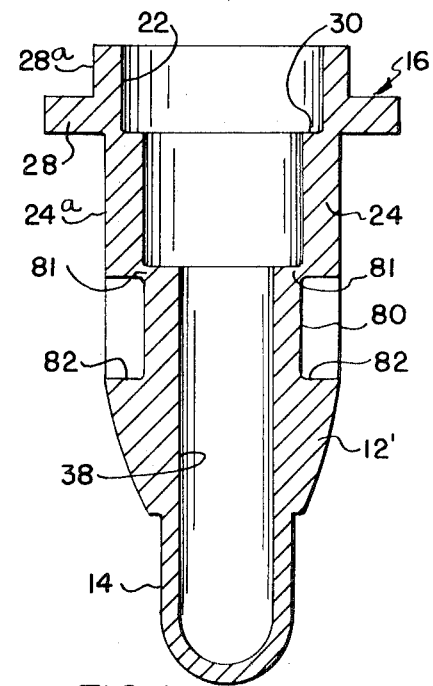
FIG. 4 is a sectional view taken generally along the plane of line 4—4 of FIG. 2, looking in the direction of the arrows.

As can be best seen in FIG. 4, there is an opening 22 extending through the fastener which is open at its upper end, but preferably closed at its lower end, in the protrusion portion 14. Relatively thin plastic sections 23 (FIG. 2) which sections may be of the order of two hundredths of an inch thickness, also connect the body portion 12' to the head portion 16. These thin sections supplement the connection of the aforementioned locking legs 18.

Depending from the head portion 16 and on opposite sides of the body portion as compared to the sides of the body portion on which are disposed the straplike legs 18, are tabs 24, 24a. In this arrangement, the plastic fastener does not embody the camlike surface construction of U.S. Pat. No. 3,313,083 on the body 12' thereof, which will urge the tabs 24, 24a outwardly, and thus the present fastener does not possess the tab locking feature of U.S. Pat. No. 3,313,083. However, such fastener does possess the collapsible straplike legs 18 which are adapted to collapse and to secure the fastener to a supporting panel. In addition, during threaded insertion of a rotatable screw member into such fastener, the outward deformation of the body 12' of the fastener will cause some outward movement of the tab portions 24, 24a away from one another, but not to the extent aforedescribed in connection with U.S. Pat. No. 3,313,083. However, the tabs 24, 24a will aid in guiding the plunger portion 80 of the fastener body 12' during the latter's inward axial movement toward the head portion 16, and engagement between the ends of the tabs and confronting abutment surfaces 82 on the body 12' serve to limit such axially inward movement of the body portion toward the head portion, upon collapsing or folding of the legs 18.

In operation, the fastener may first be inserted through aligned polygonal openings, as shown and disclosed in U.S. Pat. No. 3,313,083, and a threaded member, upon rotation, threadably engages and cuts into the interior surface 38 (FIG. 4) of the opening 22 and commences to draw the body portion 12' axially toward the flanged head portion 16 thereby causing collapsing of the straplike leg portion 18, which, as aforementioned, already diverge outwardly with respect to one another, as at 18a and 18b. This initial collapsing may occur before the head of a screw engages the abutments, as at 30 of FIG. 4. Further rotation of the threaded member causes further movement of the body portion 12' toward the head portion 16 and movement of the fastener to its finalizing deformed position in the panels. During the inward movement of the body portion 12' toward the head portion 16 due to the rotation of the threaded member and its threaded coaction with the surface 38 of the fastener, the tabs 24 and 24a slide on the plunger portions 80 to aid in guiding the plunger portion during the latter's inward axial movement until the tabs engage against the abutment surface 82 on the body 12' to limit such axial inward movement of the body portion toward the head portion upon collapsing or folding of the legs 18.

When the fastener is drawn up tight, the deformed or collapsed legs 18 and the tabs 24, 24a, engage in sealing relation with the peripheries of the openings in the panels and effectively seal such openings against the entry of moisture, etc. It will also be seen that due to the closed lower end of the projection 14, no moisture can enter through the passage 22 in the fastener.

The head 16 preferably embodies a flange portion 28 which flange portion may be adapted for abutting engagement with the confronting side of the supporting panel A, and a collar portion 28a projecting upwardly from the flange. The head has abutment surfaces 30 therein, which are adapted for engagement with the head of a threaded member for limiting the movement of the screw into the collar, as shown in U.S. Pat. No. 3,313,083. The collar portion 28a is preferably of such depth that the head of a screw is received completely therein upon collapsing of the fastener into its finalized secured condition on the supporting panel or panels.

It is claimed:

1. A plastic fastener device adapted for insertion through an opening in a supporting member, said device comprising,
   a. a head portion adapted to be disposed adjacent one side of said supporting member,
   b. said head portion having a bore adapted to receive a threaded member therethrough,
   c. at least one pair of laterally spaced tab portions depending generally axially downwardly from said head portion,
   d. a body portion including an integral plunger member depending generally axially downwardly from said head portion, the upper end of said plunger member being severably connected to said tab portions,
   e. said body portion and plunger member having a bore disposed in axial alignment with the bore in said head portion adapted for self-threading engagement with a threaded member inserted therethrough,
   f. a pair of laterally spaced, resilient leg portions disposed on opposite sides of said tab portions connected at one end adjacent said head portion and at the other end adjacent said body portion adapted to be deformed outwardly with upward movement of said plunger member between said tab portions upon turning movement of said threaded member through said bores, and
   g. abutment means disposed adjacent the juncture of said plunger member with said body portion adapted for engagement with said tab portions to limit upward movement of said body portion toward said head portion.

2. A fastener device in accordance with claim 1, wherein
   a. said plunger member is of a polygonal shape in transverse cross section adapted to be received in a complementary shaped opening defined between said tab portions.

3. A fastener device in accordance with claim 1, wherein
   a. said tab portions extend generally parallel to one another and generally parallel with respect to the confronting exterior surfaces of said plunger member.

4. A fastener device in accordance with claim 3, wherein
   a. said leg portions initially diverge outwardly from one another and then converge toward one another in outwardly spaced relation from the tab portions and said plunger member.

5. A fastener device in accordance with claim 1, wherein
   a. said plunger member has a reduced transverse dimension as compared to said body portion.

6. A fastener device in accordance with claim 1, wherein
   a. said body portion includes an integral, hollow protrusion depending downwardly therefrom,
   b. said protrusion being closed at one end and having an axial bore disposed in alignment with the bore in said body portion.

7. A fastener device in accordance with claim 1, wherein
   a. said head portion includes a laterally outwardly projecting flange adapted for engagement with one side of a support member.

8. A fastener device in accordance with claim 1, wherein
   a. the transverse distance between said tab portions is slightly greater than the transverse dimension of said plunger member, whereby said plunger member is adapted to be slidably received in generally parallel relation between said tab portions upon movement of said body portion toward said head portion.

9. A fastener device in accordance with claim 1, wherein
   a. the transverse wall thickness of said plunger member is substantially greater than the transverse thickness of said leg portions.

10. A fastener device in accordance with claim 1, wherein
    a. said body portion is of a wedgelike shape tapered in a downward and inward direction away from said head portion.